Aug. 11, 1953
A. W. RICHENS
2,648,263
METHOD OF MAKING BAGS
Filed Oct. 2, 1948
6 Sheets-Sheet 1
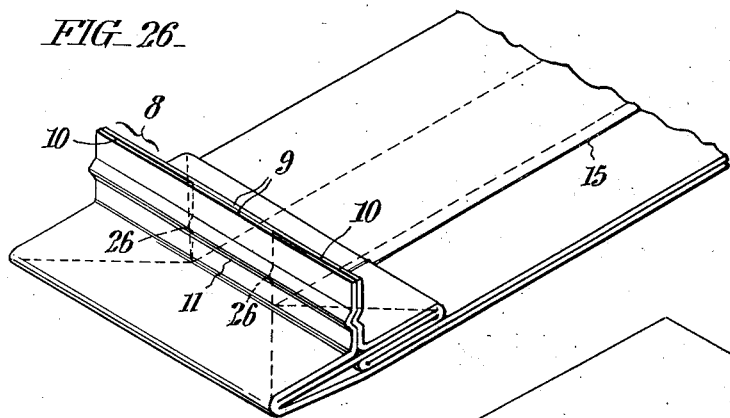
FIG_26_
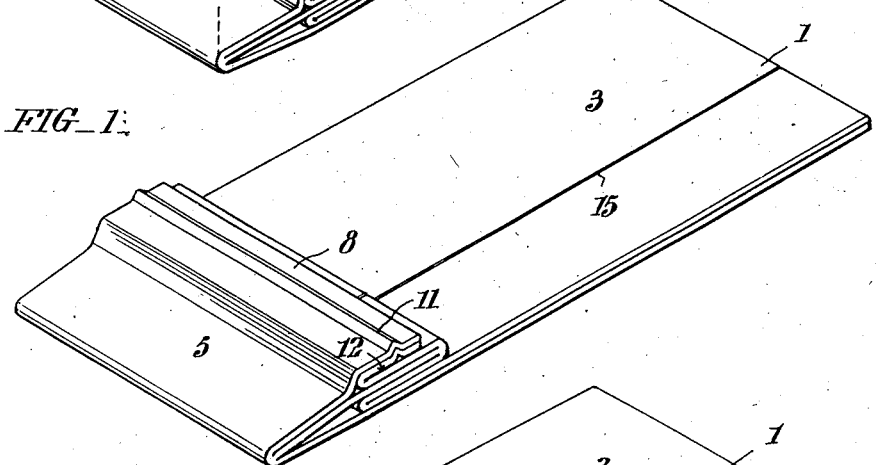
FIG_1_
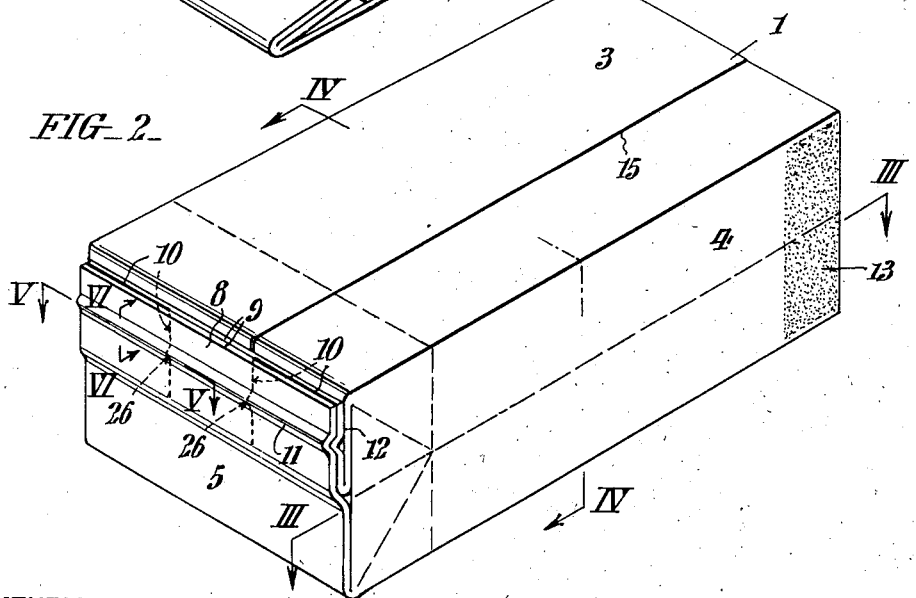
FIG_2_
WITNESSES
Hubert Fuchs
Thomas W. Kerr Jr.
INVENTOR:
Arthur W. Richens,
BY Paul & Paul
ATTORNEYS.

Aug. 11, 1953 A. W. RICHENS 2,648,263
METHOD OF MAKING BAGS
Filed Oct. 2, 1948 6 Sheets-Sheet 2
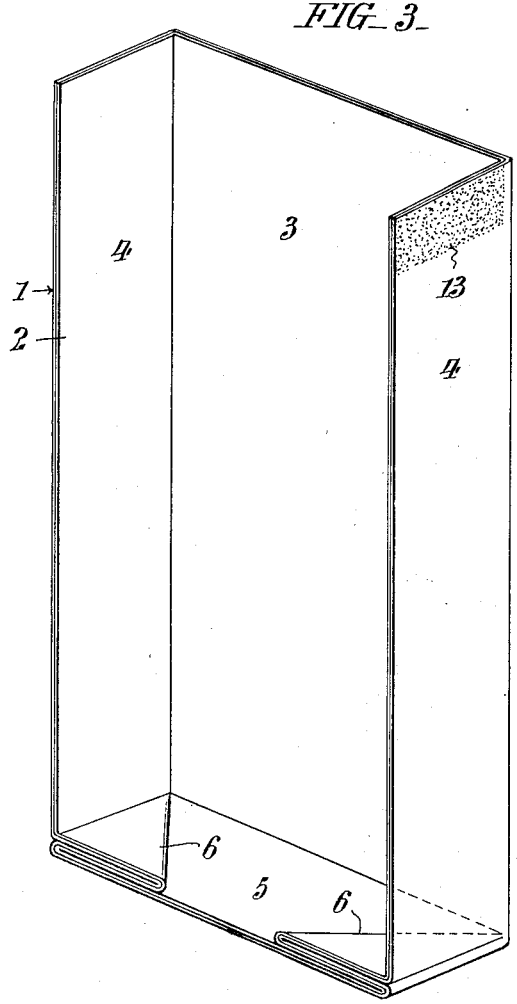
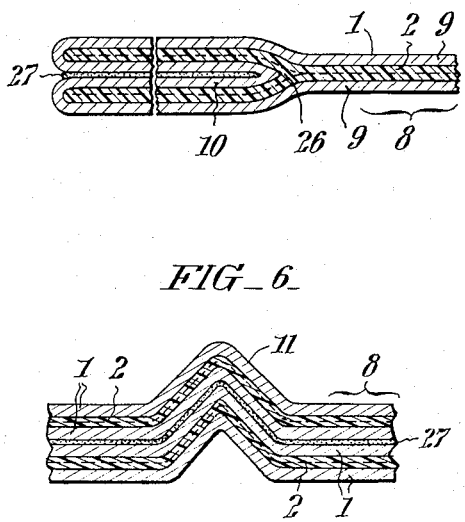
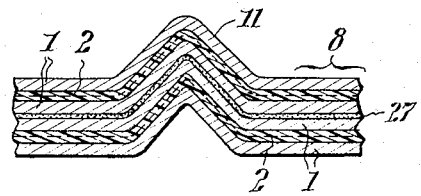
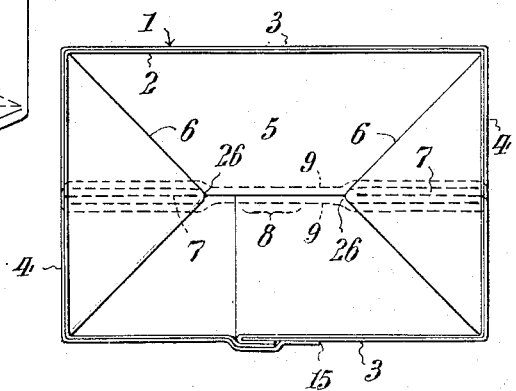
WITNESSES
Hubert Fuchs
Thomas W. Kerr Jr.
INVENTOR:
Arthur W. Richens,
BY Paul & Paul
ATTORNEYS.

Aug. 11, 1953  A. W. RICHENS  2,648,263
METHOD OF MAKING BAGS
Filed Oct. 2, 1948  6 Sheets-Sheet 3
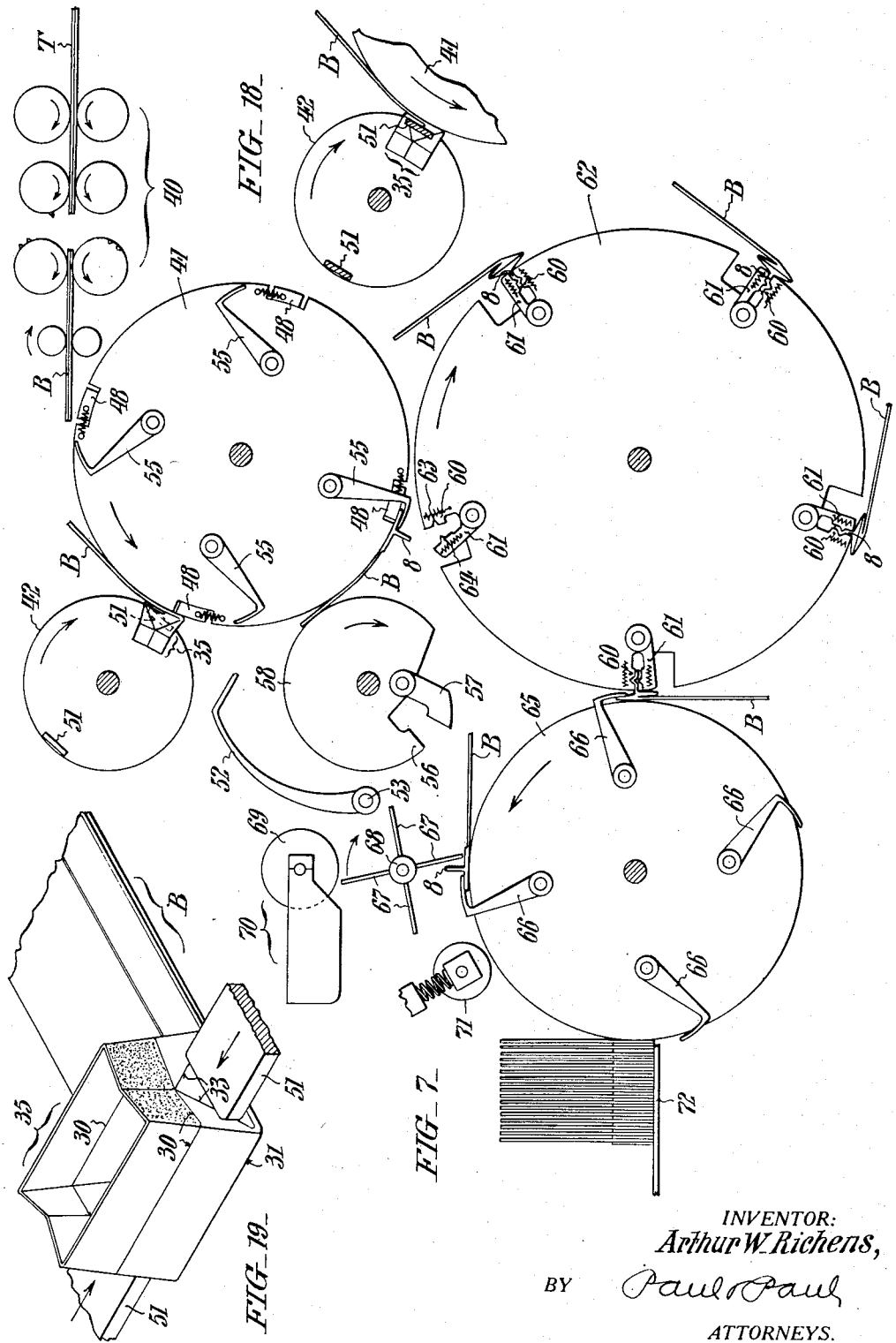
INVENTOR:
Arthur W. Richens,
BY Paul & Paul
ATTORNEYS.

Aug. 11, 1953 — A. W. RICHENS — 2,648,263
METHOD OF MAKING BAGS
Filed Oct. 2, 1948 — 6 Sheets-Sheet 4
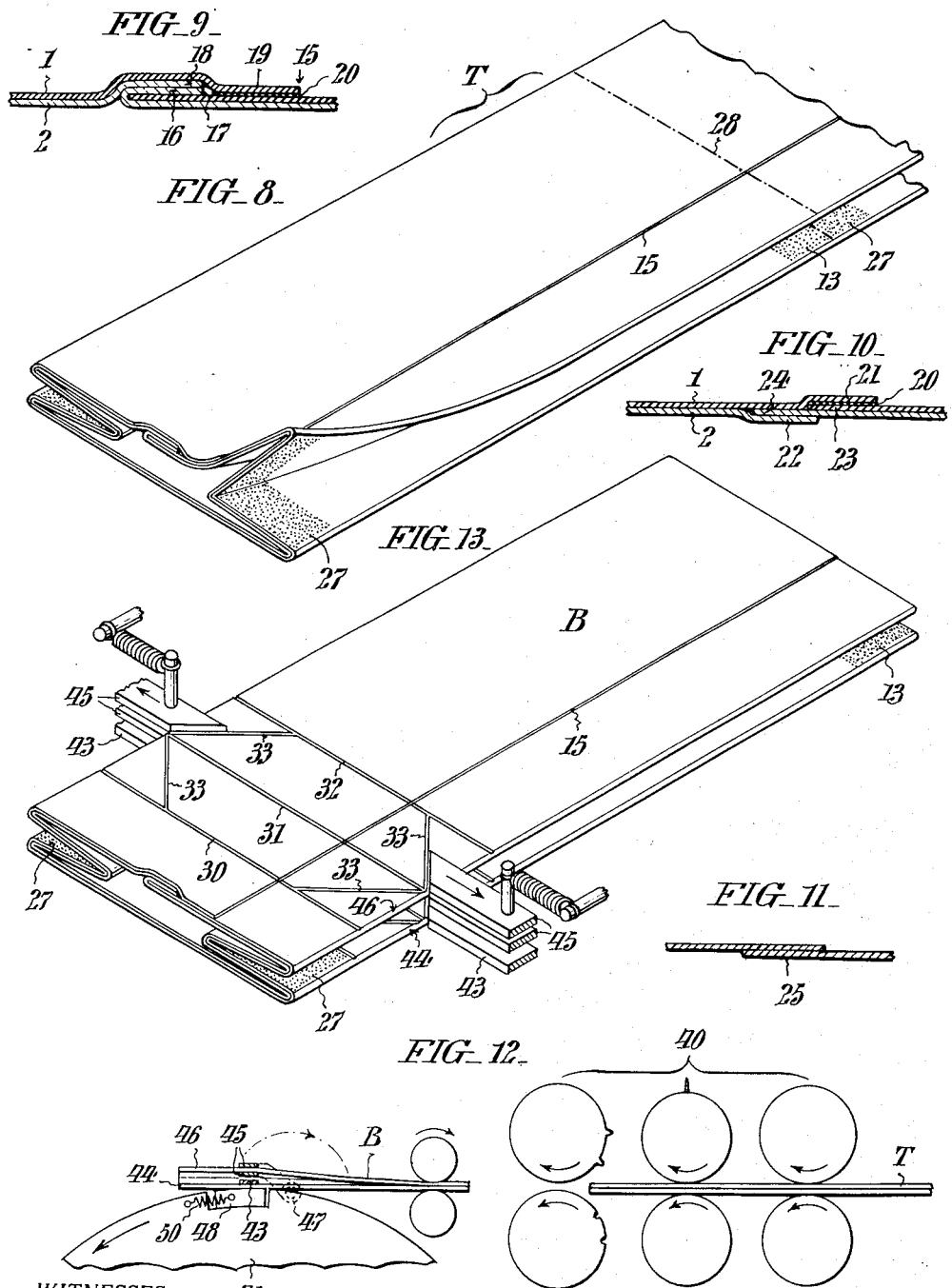
WITNESSES
Hubert Fuchs
Thomas W. Kerr, Jr.
INVENTOR:
Arthur W. Richens,
BY Paul & Paul
ATTORNEYS.

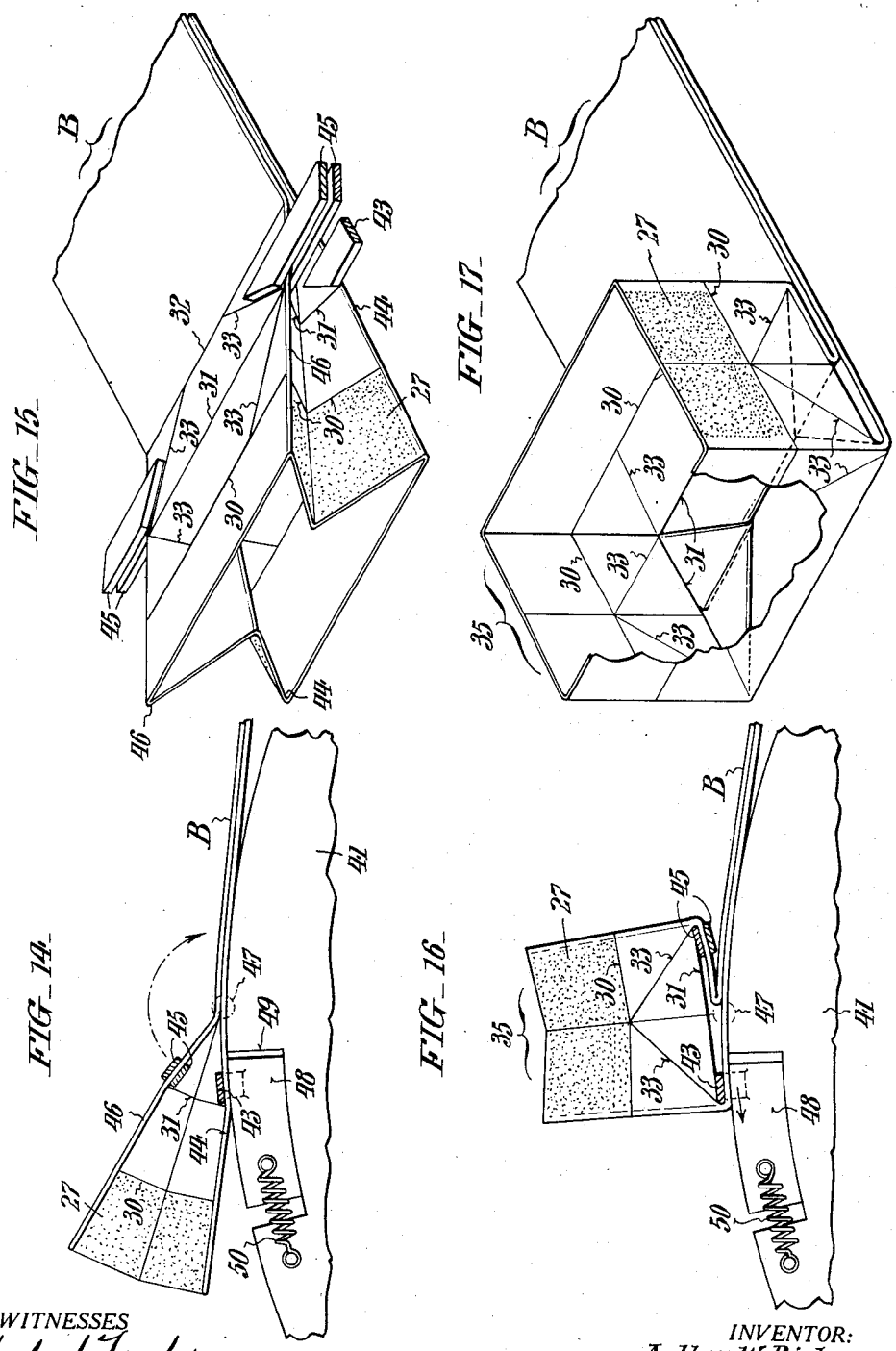

Aug. 11, 1953  A. W. RICHENS  2,648,263
METHOD OF MAKING BAGS
Filed Oct. 2, 1948  6 Sheets-Sheet 6
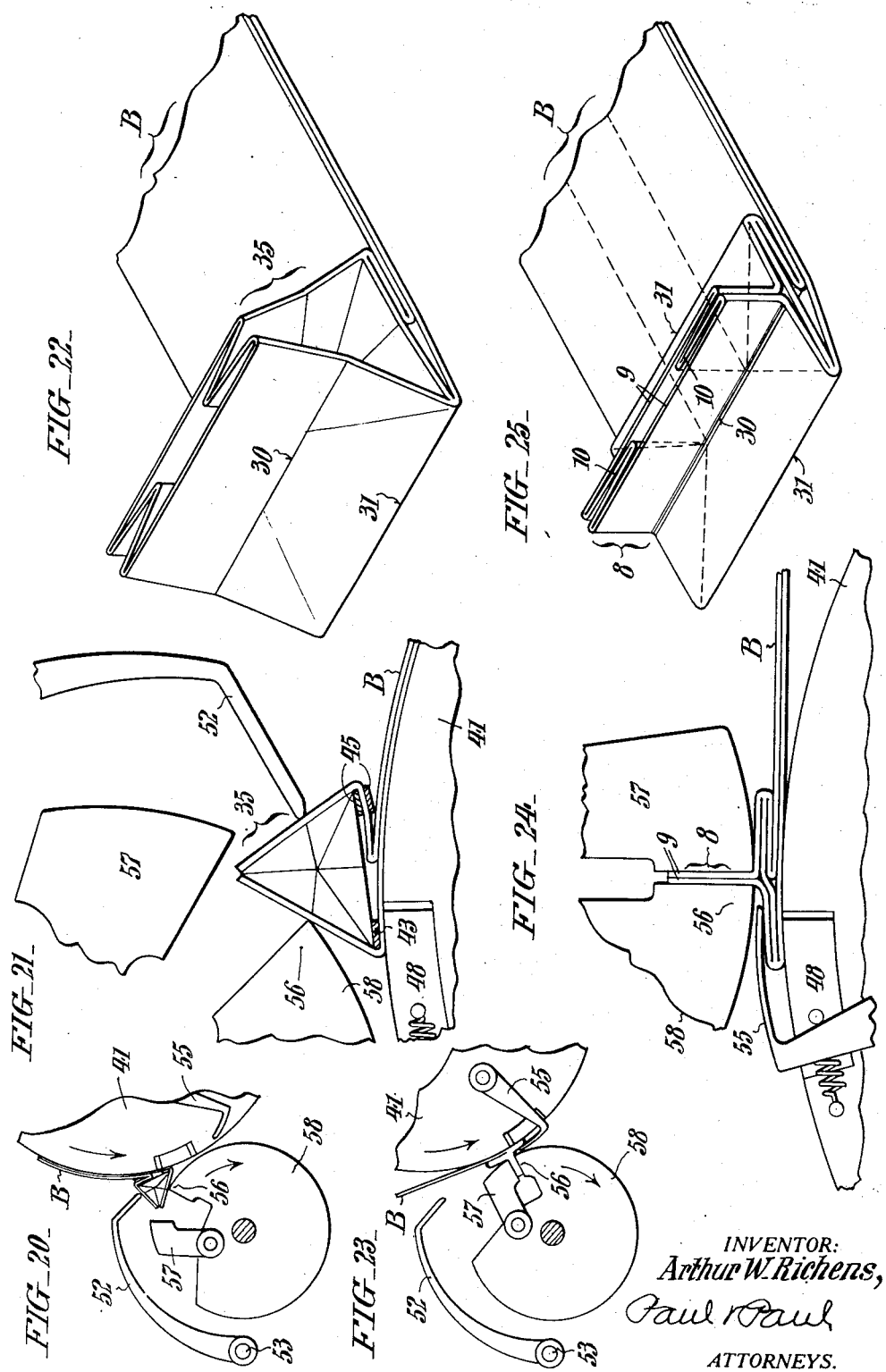
INVENTOR:
Arthur W. Richens,
Paul & Paul
ATTORNEYS.

Patented Aug. 11, 1953

2,648,263

UNITED STATES PATENT OFFICE 2,648,263

METHOD OF MAKING BAGS

Arthur W. Richens, Upper Darby, Pa.

Application October 2, 1948, Serial No. 52,465

4 Claims. (Cl. 93—35)

This invention relates to bags, and also to methods of making bags from sheet paper or film or a combination or lamination of the two coated on the inner surface, or on certain portions thereof, with thermo-plastic adhesive, from any material having suitable moisture resisting and heat sealing properties, from material of the latter kind without a lining, or from extruded tubing.

The chief aim of my invention is to provide a bag of the kind ordinarily known as an "automatic" or square bottomed bag which, when opened up, will stand on end for convenience in filling it, which can be made from any of the materials above referred to, and which has its bottom hermetically sealed against seepage through it of liquids or pulverulent materials with which the bag may be filled.

Another object of my invention is to enable, through provision of a simple method such as hereinafter disclosed, quantity production of automatic or square bottomed bags having the foregoing attributes, expeditiously and economically without having to resort to special cutting, slitting or dieing out operations.

Other objects and attendant advantages will appear from the following detailed description of the attached drawings, wherein:

Fig. 1 is a perspective view of my improved bag flattened out in condition for packaging.

Fig. 2 is a view, likewise in perspective, showing the bag opened up in readiness to be filled.

Figs. 3 and 4 are vertical and horizontal sections of the bag taken as indicated by the angled arrows III—III and IV—IV in Fig. 2.

Figs. 5 and 6 are fragmentary sectional views on a magnified more or less exaggerated scale taken as indicated respectively by the angled arrows V—V and VI—VI in Fig. 2.

Fig. 7 is a diagrammatic view in longitudinal section of a machine suitable for the commercial production of my improved bags in quantity.

Fig. 8 is a fragmentary view in perspective view showing a portion of a flat plicated tube from which blanks for the bags are cut.

Figs. 9, 10 and 11 show, in cross section, alternative types of lap joints which may be used for the longitudinal seams when the tube is formed from sheet material.

Fig. 12 is a fragmentary view of a portion of a bag producing machine suitable for the carrying out of my improved method, showing the initial steps of cutting the bag lengths from the base tube and scoring them.

Fig. 13 is a perspective view showing how grippers embodied in the machine act upon the scored end portion of a blank in preparation for the formation of the bag bottom in accordance with my invention.

Figs. 14, 15 and 16, 17 are views like Figs. 12 and 13 respectively, showing the next step of my improved method by which the scored portion of the blank is opened up to box formation and at the same time turned upright.

Figs. 18 and 19 show how the box formation is pushed inward from opposite ends to start collapse thereof about various of the score lines.

Figs. 20 and 21 are fragmentary portions of the machine by which the box formation is next pushed in from opposite sides to induct further collapse with attendant formation of an upstanding crosswise terminal flap.

Fig. 22 is a perspective view showing the blank with the bag bottom partly collapsed.

Figs. 23 and 24 are fragmentary views of another part of the machine, showing a succeeding step of the method by which the bag bottom is completely collapsed.

Fig. 25 is a perspective view of the blank after the bag bottom is collapsed as in Figs. 23 and 24; and Fig. 26 shows the results of an immediately following step in which a sharp longitudinal ridge is impressed in the terminal flap and the flap at the same time sealed by hot pressing to fuse together the mutually contacting surfaces of the inner coating or lining of thermo-plastic incorporated in the flap.

My improved bag may be produced from sheet material such as paper or the like lined or coated wholly or in part with thermo-plastic material, or it may be produced wholly of thermo-plastic sheet material, depending upon the particular use for which it is intended. In Figs. 1-4 the bag is shown as formed from a sheet 1 which may be of paper, and an adhered sheet 2 of thermo-plastic material, with opposite side walls 3 and opposite end walls 4 at right angles and with a square bottom 5. The bag bottom 5 is constituted by triangular folds 6 which are tucked in from opposite end walls 4 and overlapped by folds turned inward from the side walls 3, and by a crosswise central terminal flap 8 in which extensions 9 of said side walls and interposed lateral tucks 10 (Fig. 5) mutually contact each other. The abutting faces of the lining 2 within the area of the flap 8 are continuously fused together and the bottom rendered leakproof through provision of the flap with a sharply impressed longitudinal ridge 11, said flap being turned down upon the bottom and adhered thereto as shown at 12 in Figs. 1 and 2 so that the completed bag will readily stand on end when it is to be filled. The end walls 4 are provided at their tops and bottoms with adhesive areas 13 which are to be used in sealing the bag after it is filled.

The paper and lining sheets 1 and 2 may be laterally offset in relation to each other, and the longitudinal seam 15 of the bag formed by retroverting the projecting side edge margin 16 of the lining sheet, see Fig. 9, back upon the outer side of the paper sheet along the corresponding side edge 17 thereof and lapped by a like area 18 of the lining sheet adjacent its opposite edge, and the projecting margin 19 of the paper sheet extended over the outer side of said paper sheet. The seam is sealed by hot pressing to unite the contacting areas of the lining with incidental fusion of thermo-plastic adhesive 20 previously applied to the projecting margin of the paper sheet to secure said margin. If desired, the paper margin may be omitted without materially weakening of the seam of Fig. 9. As an alternative, the longitudinal seam may be made as in Fig. 10 by interlapping the marginal edges 21, 22 and 23, 24 respectively of the sheets 1 and 2, and sealed as before by subjection to pressure and heat. When the bag is made from paper coated with thermo-plastic material or from plastic material alone, the seam may be of the simple overlap type shown at 25 in Fig. 11 and hot pressed to effect the bond. As another alternative, the bag may be produced from an extruded tube of thermo-plastic material to avoid the necessity for a longitudinal seam. In any case it will be seen that through provision of the sharply indented ridge 11 in the flap 8, a continuous seal will be assured at the bag bottom 5, with avoidance of leaks at the critical regions 26 in Fig. 5 adjacent the bends of the intucked folds 10 such as invariably occur in square bottomed bags as ordinarily made.

To produce bags from thermo-plastic lined or faced paper in accordance with my invention, I first form a flat longitudinally-seamed laterally-plicated tube T as in Fig. 8 to which, before the folding and plicating, thermo-plastic adhesive is applied at regularly spaced intervals as at 27 (depending upon the bag length desired), and cut the tube on transverse lines 28 centrally of the adhesived areas 27 into individual bag blanks B. Upon each such blank I impress, adjacent one end thereof, three parallel uniformly-spaced crosswise score lines 30, 31 and 32, together with angular score lines 33 which diverge inwardly at complemental angles from points of intersection of the central crosswise score line 31 with the side edges of the blank to points of intersection with the outer crosswise score lines 30—32. It will be understood that the score lines 30, 31, 32 and 33, best shown in Figure 13, occur on both the front and rear walls of the bag length and of course penetrate through the gusset fold. The scored portion of the blank is then opened out and turned up into box formation as at 35 in Fig. 17 about the central crosswise line 31 as an axis, whereupon the upturned portion is first pushed in from opposite ends as in Fig. 19 and then from opposite sides as in Fig. 22, and as a consequence caused to collapse as in Fig. 25. As the collapse takes place, the triangular areas defined by the crosswise and angular scorings fold into the tucks 6 previously referred to, with extensions 9 of the side walls 3 upstanding and the fold portions 10 of the tube plications interposed between them. The ridge 11 is next impressed in the flap 8 and the latter at the same time subjected to heat and pressure to fuse the contacting areas of the lining or facing and provide the seal. Finally, thermo-plastic or other adhesive is applied to one side of the flap 8 and the flap is turned down and adhered to the bag bottom as in Fig. 1, likewise by application of heat and pressure to complete the bag.

For the commercial production of the improved bags in quantity, a machine such as diagrammatically shown in Fig. 7 may be employed. By means not illustrated, but which may be of any suitable construction well known in the art, the plicated tube T of Fig. 8 is delivered to a set of rolls 40 by which it is scored in the manner already described and at the same time cut into the individual blanks B. From the rolls 40 the successive blanks pass between a relatively large wheel 41 and a cooperative smaller wheel 42. The large wheel 41 is provided at equally spaced points in its periphery, see Figs. 12, 13 and 14, with retractable hold down fingers 43 which engage over the lower fold edges 44 of the plications of the blank from opposite sides immediately rearward of the angular score lines 31, and with retractable spring-influenced gripper fingers 45 which engage the corresponding portion of the upper plication 46 and which are individually swingable about centers 47 (Fig. 14). By suitable means, not illustrated, the gripper fingers 45 are swung as in Figs. 12 and 14 whereby the scored part of the blank is opened up into the box-like configuration 35 as shown in Figs. 14 and 16 after which the blanks pass between the wheel 41 and a smaller cooperative wheel at 42. As the grippers 45 are swung in the manner just explained, the springs to which they are subject act to keep the blank tensioned crosswise to prevent buckling along the score lines 31 and 32. As shown, the hold down fingers 43 are supported by blocks 48 occupying notches 49 in the periphery of the wheel 41, said blocks being acted upon by relatively light pull springs 50. The wheel 42 carries a pair of retractable fingers 51 which push the ends of the box-like formation inward as in Figs. 18 and 19 to induce collapsing thereof in one direction. By means of a tucking finger 52 fulcrumed at 53, the box-like formation 35 is next engaged from one side, and soon thereafter from the opposite side as in Fig. 21 by a movable clamp jaw 57 on another wheel 58. The jaw 57 is opposed by a fixed clamp jaw 56 on wheel 58 and eventually closes upon the upturned end of the box-like formation as shown in Fig. 23 to complete its collapse, the gripper fingers 43 and 45 being withdrawn from operative position at this time. One of the pivoted clamp fingers 55 on wheel 41 next comes into action to hold the blank to said wheel until the flap 8 which results from the collapsing passes into the interval between fixed and movable electrically heated clamp jaws 60 and 61 at the periphery of still another wheel 62, whereupon the finger 55 is withdrawn. As shown the fixed and pivoted clamp jaws 60 and 61 of the wheel 62 are respectively provided with a sharp transverse V groove 63 and a mating V projection 64 to impress the ridge 11 in the tab 8. The jaws 60 and 61 remain closed during the greater part of a revolution of the wheel 62 to keep the flap 8 under pressure for fusion of the thermo-plastic lining or facing and the adhesive 27 involved in the plies 9 and folds 10 of the flap and to hold the blanks to said wheel for delivery to still another wheel 65 which is provided with hold down fingers 66 to receive the blanks B. As the blanks are carried about the wheel 65, thermo-plastic or other adhesive is applied to the tabs 8 at one side by wiper vanes 67 of a rotor 68 which receive the adhesive through contact with the roll 69 of an adhesive supply device 70. After such application of adhesive, the blanks pass beneath a press roll 71 whereby the tabs 8 are turned down and the adhesive is fused to fix them to the bag bottoms. The now completed flat bags are finally delivered upright by the wheel 65 to a table 72 when the fingers 66 on said wheel are retracted to release the bags.

Having thus described my invention, I claim:

1. A method of making bags comprising: continuously advancing in the direction of its length a bag length of flattened gussetted tube having on its inner surface portions at least of thermoplastic material; during such advance, opening one end of said tube to form an open rectangular box having its bottom in the flattened body of the tube; during such advance, collapsing the walls of said box against the body of the bag to leave an upstanding fin running transverse the length of the tube; during such advance, and with said fin in upstanding condition, subjecting said fin within at least one of said portions of thermoplastic material to heat and pressure, and thereafter securing said fin against the body of the bag.

2. A method as set forth in claim 1 including the step of sealing together the contacting external gusset surfaces within the area of the fin.

3. A method as set forth in claim 1 in which the bag length is advanced at substantially constant speed.

4. A method as set forth in claim 3 including the step of sealing together the contacting external gusset surfaces within the area of the fin.

ARTHUR W. RICHENS.

References Cited in the file of this patent

UNITED STATES PATENTS

| Number | Name | Date |
|---|---|---|
| 337,694 | Lorenz | Mar. 16, 1886 |
| 388,612 | Appel | Aug. 28, 1888 |
| 699,639 | Appel | May 13, 1902 |
| 1,029,784 | Appel | June 18, 1912 |
| 1,058,806 | Stillwell | Apr. 15, 1913 |
| 2,006,060 | Schilder | June 25, 1935 |
| 2,114,625 | Bergstein | Apr. 19, 1938 |
| 2,259,752 | Kimple | Oct. 21, 1941 |
| 2,298,522 | Waters | Oct. 13, 1942 |
| 2,333,440 | Potdevin | Nov. 2, 1943 |
| 2,353,605 | Waters | July 11, 1944 |
| 2,396,565 | Gardner | Mar. 12, 1946 |
| 2,409,621 | Geimer | Oct. 22, 1946 |
| 2,412,501 | Gardner | Dec. 10, 1946 |